US010484482B2

(12) United States Patent
Trinite et al.

(10) Patent No.: US 10,484,482 B2
(45) Date of Patent: Nov. 19, 2019

(54) METHOD AND SYSTEM FOR SHIFTING A COMMUNICATION SESSION

(71) Applicant: ALE INTERNATIONAL, Colombes (FR)

(72) Inventors: Benoit Trinite, Montesson (FR); Georges Nogueira, Schiltigheim (FR); Emmanuel Leonidovich Helbert, Andlau (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 15/777,569

(22) PCT Filed: Dec. 18, 2015

(86) PCT No.: PCT/IB2015/059775

§ 371 (c)(1),
(2) Date: May 18, 2018

(87) PCT Pub. No.: WO2017/085536

PCT Pub. Date: May 26, 2017

(65) Prior Publication Data

US 2018/0338008 A1 Nov. 22, 2018

(30) Foreign Application Priority Data

Nov. 20, 2015 (EP) .................................... 15306846

(51) Int. Cl.
*H04L 29/06* (2006.01)
*H04L 29/08* (2006.01)
(Continued)

(52) U.S. Cl.
CPC .......... *H04L 67/148* (2013.01); *H04L 12/189* (2013.01); *H04L 63/0428* (2013.01);
(Continued)

(58) Field of Classification Search
CPC ............. H04L 65/1006; H04L 65/1016; H04L 65/1053; H04L 65/1069
See application file for complete search history.

(56) References Cited

U.S. PATENT DOCUMENTS

2003/0086390 A1 5/2003 Eschbach et al.
2005/0033843 A1 2/2005 Shahi et al.
(Continued)

FOREIGN PATENT DOCUMENTS

WO 2012053884 A1 4/2012
WO WO2012053884 * 4/2012

OTHER PUBLICATIONS

International Search Report with regard to PCT/IB2015/059775 dated Mar. 29, 2016.
(Continued)

*Primary Examiner* — Aftab N. Khan
(74) *Attorney, Agent, or Firm* — BCF LLP

(57) ABSTRACT

A communication device comprising: a tag reader (202) configured to: —read an identification tag signal (204) comprising an identification indication of a target communication device (105), a discovery module (206) configured to: —send a discovery request (210) to a registration service infrastructure (205), comprising the identification indication, —receive a discovery response (211) from the registration service infrastructure (205), comprising network location information of the target communication device (105), a session control module (207) configured to: —send a shift request (209) to a home communication node (107) for shifting a communication session from the initial communication device to the target communication device (105), wherein the home communication node (107) handles all communication sessions with the initial communication device, the shift request (209) comprising the network location information of the target communication device
(Continued)

(105), —terminate the communication session with the remote communication device (105).

16 Claims, 10 Drawing Sheets

(51) Int. Cl.

| | |
|---|---|
| ***H04W 80/10*** | (2009.01) |
| ***H04L 12/18*** | (2006.01) |
| *H04W 88/02* | (2009.01) |

(52) U.S. Cl.

CPC ........ *H04L 63/126* (2013.01); *H04L 65/1073* (2013.01); *H04L 65/1083* (2013.01); *H04L 65/1086* (2013.01); *H04L 67/02* (2013.01); *H04L 67/141* (2013.01); *H04W 80/10* (2013.01); *H04W 88/02* (2013.01)

(56) References Cited

U.S. PATENT DOCUMENTS

| | | | | |
|---|---|---|---|---|
| 2007/0032225 | A1 | 2/2007 | Konicek et al. | |
| 2007/0162300 | A1* | 7/2007 | Roever | G06Q 20/12 705/57 |
| 2010/0071053 | A1* | 3/2010 | Ansari | G06Q 30/04 726/12 |
| 2010/0107230 | A1* | 4/2010 | Tyagi | H04L 63/08 726/6 |
| 2011/0058478 | A1 | 3/2011 | Krym et al. | |
| 2011/0196521 | A1 | 8/2011 | Jain et al. | |
| 2012/0272158 | A1* | 10/2012 | Weskamp | H04W 4/023 715/748 |
| 2013/0212287 | A1* | 8/2013 | Chappelle | H04M 3/58 709/227 |
| 2014/0047487 | A1* | 2/2014 | Guedalia | H04W 4/70 725/80 |
| 2014/0087705 | A1 | 3/2014 | Wooster et al. | |
| 2014/0359139 | A1* | 12/2014 | Efrati | H04L 65/403 709/227 |
| 2015/0058409 | A1 | 2/2015 | Wang | |
| 2018/0376317 | A1* | 12/2018 | Kim | H04L 63/08 |

OTHER PUBLICATIONS

Supplementary European Search Report with regard to EP15908690.9 completed Mar. 7, 2019.

* cited by examiner

METHOD AND SYSTEM FOR SHIFTING A COMMUNICATION SESSION

FIELD OF THE INVENTION

The invention relates generally to a system and a method for shifting a communication session from an initial communication device to a target communication device, especially when the initial communication device and the target communication device do not belong to the same private network.

BACKGROUND

Communication systems are known wherein a communication session is firstly launched between a first phone and a second phone, wherein the first phone belongs to a private network, and the communication session is secondly shifted from the first phone to a third phone belonging to the same private network. As employed herein, a communication device belongs to a private network means that the communication device is connected to a private communication network of an organization by the Private Branching Exchange (PBX) of the organization.

SUMMARY

An idea at the basis of the invention is to provide secured identification of communication devices homogeneously in a complex heterogeneous communication system, for example a communication system comprising communication devices belonging to different private networks. An idea at the basis of the invention is to provide communication session shifting functions between communication devices belonging to different private networks.

In an embodiment, the invention provides a method for shifting a communication session from an initial communication device to a target communication device, comprising:

- reading an identification signal comprising an identification indication of the target communication device,
- sending a discovery request to a registration service infrastructure, wherein the discovery request comprises the identification indication of the target communication device,
- receiving a discovery response from the registration service infrastructure, the discovery response comprising network location information of the target communication device,
- sending a shift request to a home communication node of the initial communication device for shifting a communication session established between the initial communication device and a remote communication device from the initial communication device to the target communication device, wherein the home communication node handles all communication sessions for the initial communication device, the shift request comprising the network location information of the target communication device,
- terminating the communication session with the remote communication device.

According to embodiments, such a method may comprise one or more of the features below.

In an embodiment, the discovery request is a HyperText Transfer Protocol (HTTP) request and the registration service infrastructure comprises a web server.

In an embodiment, the identification indication comprises a communication device identifier of the target communication device, wherein the communication device identifier is stored in a registration database of the registration service infrastructure.

In an embodiment, the discovery response further comprises an encrypted communication device identifier, the method further comprising:

- applying a cryptographic function on the identification indication of the target communication device in order to get a calculated encrypted identification indication,
- comparing the calculated encrypted identification indication to the encrypted communication device identifier in order to
- sending the shift request to the home communication node for shifting the communication session in response to determining an equality between the calculated encrypted device identifier and the stored encrypted device identifier.

The cryptographic function may be various. For example, the cryptographic function is a hash function.

In an embodiment, the identification indication comprises the communication device identifier of the target communication device.

In an embodiment, the invention provides a communication device comprising:

- a tag reader configured to:
- read an identification tag signal comprising an identification indication of a target communication device,
- a discovery module configured to:
- send a discovery request to a registration service infrastructure, wherein the discovery request comprises the identification indication of the target communication device,
- receive a discovery response from the registration service infrastructure, the discovery response comprising network location information of the target communication device,
- a session control module configured to:
- send a shift request to a home communication node of the initial communication device for shifting a communication session established between the initial communication device and a remote communication device from the initial communication device to the target communication device, wherein the home communication node handles all communication sessions for the initial communication device, the shift request comprising the network location information of the target communication device,
- terminate the communication session with the remote communication device.

According to embodiments, such a communication device may comprise one or more of the features below.

There are various optical and radio technologies that may be used for reading the identification tag signal, for example optical camera with image processing capabilities, e.g. QR code readers, infrared receivers, Bluetooth receivers, NFC readers, e-Beacon receivers, ZigBee receivers, or Wi-Fi receivers, or any Radio Frequency Identification (RFID) transceivers.

In an embodiment, the tag reader comprises an optical camera with image processing capabilities for reading an image.

In an embodiment, the tag reader comprises a receiver for receiving the identification tag signal as a modulated electromagnetic signal.

In an embodiment, the tag reader comprises a radio transceiver for reading a passive Radio Frequency Identifier RFID tag.

They are various communication devices which can be used. For example, the communication device is a mobile phone. For example, the communication device is a digital tablet or any computer device adapted to communicate through VoIP or Skype communication sessions.

In an embodiment, the home communication node is a Private Branching Unit (PBX). In an embodiment, the home communication node is a gateway of the private network in which the communication mobile is registered.

In an embodiment, the invention provides a registration service infrastructure comprising a registration data repository, a data processing unit and a network interface, wherein the registration data repository stores a plurality of communication device identifiers, each device identifier being stored in association with network location information of a registered communication device for switching communication sessions to the registered communication device, the network interface being further configured to receive a discovery request from a requesting communication device, wherein the discovery request comprises the communication device identifier of a registered communication device, the data processing unit being configured to retrieve the network location information associated with the communication device identifier of the registered communication device, the network interface being further configured to send a discovery response to the requesting communication device, wherein the discovery response comprises the retrieved network location information, such that the requesting communication device gets the network location information necessary to shift a communication session to the registered communication device.

According to embodiments, such a registration service infrastructure may comprise one or more of the features below.

In an embodiment, the data processing unit is further configured to receive a registration request from a registering communication device through the network interface, the registration request comprising network location information of the registering communication device, the data processing unit being configured to:

- generate a communication device identifier associated with the registering communication device,
- store into the registration data repository the device identifier in association with the received network location information, and
- the data processing unit being further configured to send to the registering communication device the generated device identifier through the network interface.

In an embodiment, the network location information further comprises a public identifier of the target communication device, wherein the public identifier of the target communication device is an address of the target communication device in a public network to which the target communication device is connected.

The public identifier depends on the public communication infrastructure the communication device is connected with. For example, the public identifier of the target communication device is a Fully Qualified Domain Name (FQDN). For example, the public identifier of the target communication device is an external phone number.

In an embodiment, the network location information of the target communication device comprises:

A local identifier of the target communication device, wherein the local identifier of the target communication device is an address of the target communication device in a local network to which the target communication device is connected, An identifier of a home communication node handling all communication sessions for the target communication device.

The association of a local identifier and an identifier of a home communication node allows retrieving a network location of the target communication device. For example, the home communication node is a communication server FQDN. For example, the home communication node is a PBX. The private identifier of the communication device is registered in the home communication node in order to allow the home communication node to handle all communication sessions involving the communication device.

In an embodiment, the network location information is xml formatted or json formatted.

In an embodiment, the registration data repository further stores supplementary information comprising:

the kind of media supported or allowed by the target communication device, e.g. voice, video etc., and some restrictions depending on the session shift context, e.g. hourly access restriction or call destination limitations.

Optionally, the supplementary information is xml formatted or json formatted

In an embodiment, the registration service infrastructure comprises a web portal authenticated by a certification authority.

In an embodiment, the data processing unit of the registration service infrastructure is further configured to:

apply a cryptographic function on the communication device identifiers, in order to get encrypted communication device identifiers, and store each encrypted communication device identifier in association with the communication device identifier, in response to receiving the discovery request from the requesting communication device, retrieve the encrypted communication device identifier associated with the identification indication of the target communication device, further send the encrypted communication device identifier corresponding to the communication device identifier of the target communication device to the requesting communication device.

Alternatively, in an embodiment, the data processing unit of the registration service infrastructure is further configured to:

in response to receiving the discovery request from the requesting communication device, apply a cryptographic function on the communication device identifiers, in order to get encrypted communication device identifiers, and further send the encrypted communication device identifier corresponding to the communication device identifier of the target communication device to the requesting communication device.

In an embodiment, the registration service infrastructure further comprises an identification tag carrying the communication device identifier of a registered communication device, wherein the identification tag is located in, on or at a short distance from the registered communication device. As employed herein, an identification tag refers to any analogical or digital media adapted to carry an identifier, e.g. a string of alphanumerical characters.

As employed herein, the identification tag denotes a digital or analogical physical media carrying the communication device identifier. As employed herein, the identification tag signal denotes a digital or analogical signal carrying the communication device identifier from the identification tag to the tag reader, e.g. in any coding format and any modulation format.

The identification tag may be selected from various active and passive tag technologies. In an embodiment, the passive identification tag is sheet on which the communication device identifier is printed. The communication device identifier may be printed in a symbolical or graphical coding format, e.g. as a barcode, for example a two dimensional barcode, or as a Quick Response (QR) code. In embodiments, the identification tag includes a digital memory containing the identifier coupled to an infrared or radio transmitter adapted to emit an infrared or radio identification tag signal carrying the identifier stored in the digital memory. Such embodiments may be implemented with a passive transmitter, without its own power source, e.g. a Near Field Communication (NFC) tag, or an Ultra High Frequency (UHF) tag. Short distance refers to a distance lower than a short walk for a user to access a target communication device after the user scanned the identification tag thanks to the requesting communication device, e.g. less than 20 meters, preferably less than 10 meters, more preferably less than 10 centimeters. In an embodiment, the passive identification tag is embedded in the target communication device.

In embodiments, the identification tag is an active identification tag comprising a broadcasting module embedded in a registered communication device for broadcasting an identification tag signal carrying the communication device identifier of the registered communication device. The identification signal is broadcasted in a short range area around the registered communication device. Short range area refers to an area small enough for a user to access a target communication device by a short walk, after the identification tag has been read by the requesting communication device.

In an embodiment, the invention provides a communication system comprising a registration service infrastructure as hereinabove described and a communication device as hereinabove described, wherein the discovery module of the communication device and the network interface of the registration service infrastructure are configured to communicate with each other.

According to embodiments, such a communication system may comprise one or more of the features below.

In an embodiment, the communication system further comprises the communication device as hereinabove described, and the home communication node of the initial communication device handling all the communication session for the initial communication device, wherein the home communication node is configured to:

- receive the shift request from the initial communication device for shifting the communication session, the shift request comprising the network location information of the target communication device,
- shift the communication session with the remote communication device from the initial communication device to the target communication device,
- route media streams emitted by the remote communication device to the target communication device and route media streams emitted by the target communication device to the remote communication device.

In embodiments, Session Initiation Protocol (SIP), various web services or Computer Supported Telecommunications Applications (CSTA) may be used for establishing the communication session between the initial communication device and the target communication device.

In an embodiment, the home communication node comprises a memory in which is stored a set of addresses of devices connected to a communication network, e.g. a private communication network, in association with user identities, and a processing unit configured to route media streams from and to a called device and a calling device, in response to receiving a request for establishing a communication session between the calling device and the called device.

In an embodiment, shifting the communication session comprises:

- routing media streams emitted by the initial communication device to the conference bridge, routing said media streams from the conference bridge to the remote communication device, and
- routing media streams emitted by the remote communication device to the conference bridge and routing said media streams from the conference bridge to the initial communication device,
- calling the target communication device,
- establishing a communication session between the remote communication device and the target communication device,
- routing the media streams emitted by the remote communication device and the initial communication device to the conference bridge and routing said media streams from the conference bridge to the target communication device,
- terminating the communication session between the initial communication device and the remote communication device, prior to:
- routing the media streams emitted by the remote communication device to the target communication device and routing the media streams emitted by the target communication device to the remote communication device, such that the communication session between the initial communication device and the remote communication device is terminated and a new communication session is established between the remote communication device and the target communication device.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
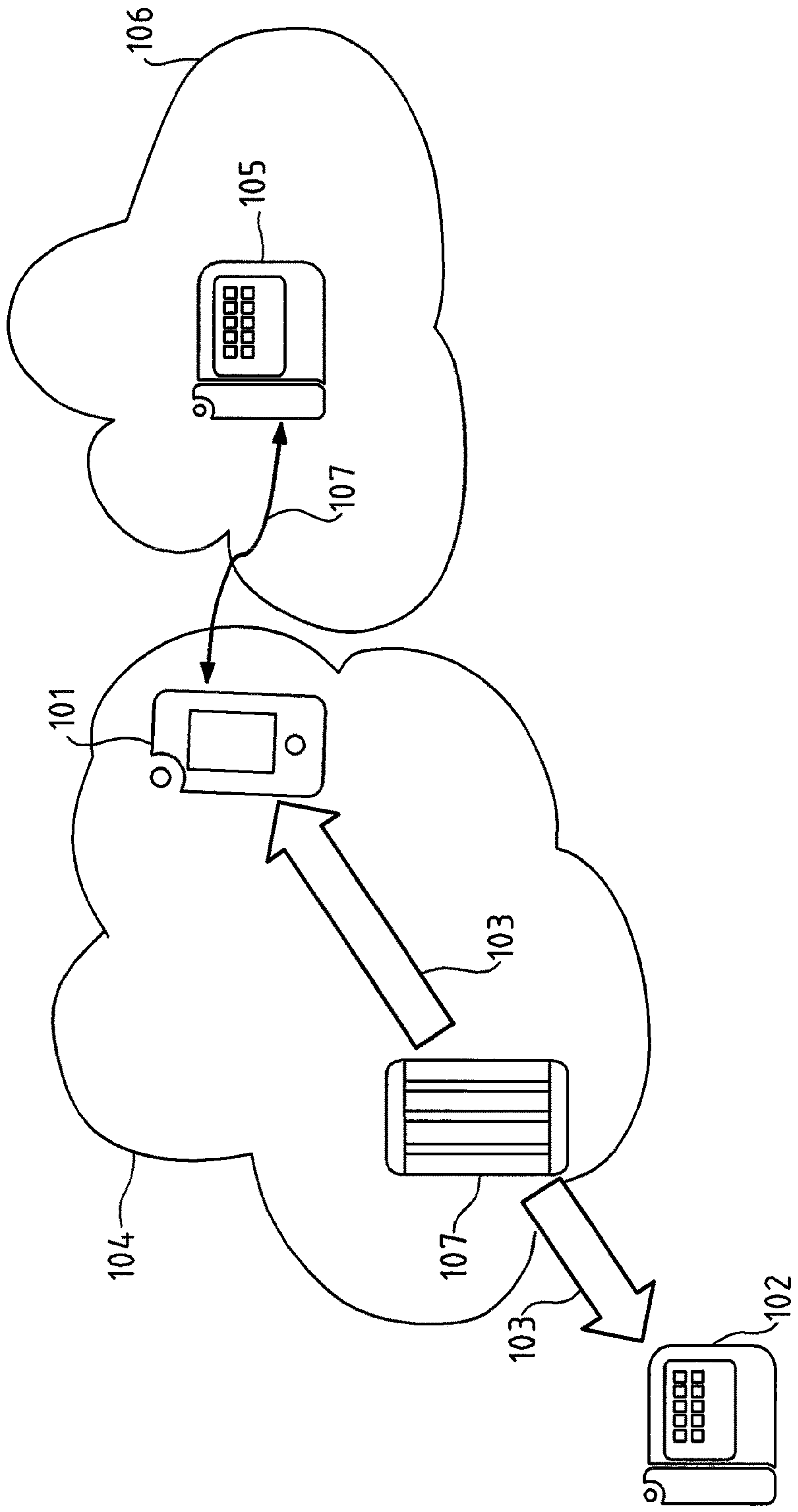
FIG. 1 schematically illustrates an initial communication device in a communication session with a remote communication device, shifting the communication session to a target communication device, according to an embodiment of the invention.

With reference to FIG. 1, an initial communication device 101 is represented in a communication session 103 with a remote communication device 102. Any one of the initial communication device 101 and the remote communication device 102 is initiator of the communication session. The initial communication device 101 and the remote communication device 102 are exchanging media streams, as represented by arrows 103. The initial communication device 101 is registered in a private network 104 and is handled by a home communication node 107. The home communication node 107 handles all communication sessions for the initial communication device 101 and will be described herein below in more details with reference to FIG. 4.

The user of the initial communication device 101 moves to a place where a target communication device 105 is available. The target communication device 105 belongs to a private network 106. For any reason, the user wants to shift the communication session, i.e. the media streams 103, from the initial communication device 101 to the target communication device 105, as represented by arrow 107.

Some possible reasons or purposes for which a user may want to shift the communication session from the initial communication device 101 to the target communication device 105 are stated below:

- to move an ongoing multi-media communication toward a target communication device 105 having better audio and/or video quality rendering than the initial communication device 101.
- to experience multi-media communications on a target communication device 105 with better media quality than on the initial communication device 101. For example, the target communication device 105 may be a desk computer, whereas the initial communication device 101 may be a mobile data tablet;
- to lower the communication costs by using device having local communication links (mobile or fixe, foreign mobile carrier . . . ). For example, the initial communication device 101 is a smartphone and the target communication device 105 is a deskphone.
- to leverage added services on a local device (local contact directory, collaboration tools such as conferencing). For example, the target communication device 105 may be a conference device in a conference room, whereas the initial communication device 101 may be a mobile phone;
- to benefit from newest design or form factor. For example, the target communication device 105 has a larger display than the initial communication device 101, or the initial communication device 101 does not have a keyboard whereas the target communication device 105 is equipped with a keyboard;
- to avoid or remedy battery shortage. For example the battery of the initial communication device 101 is very low and the use of the initial communication device 101 wants to keep on being in communication;
- to adapt a specific working environment, e.g. flex office or traveling workers In order to shift the communication session from the initial communication device 101 to the target communication device 105, the initial communication device 101 comprises specific functional modules that has subscribed to a service, as it will be described below.

Figure 2:
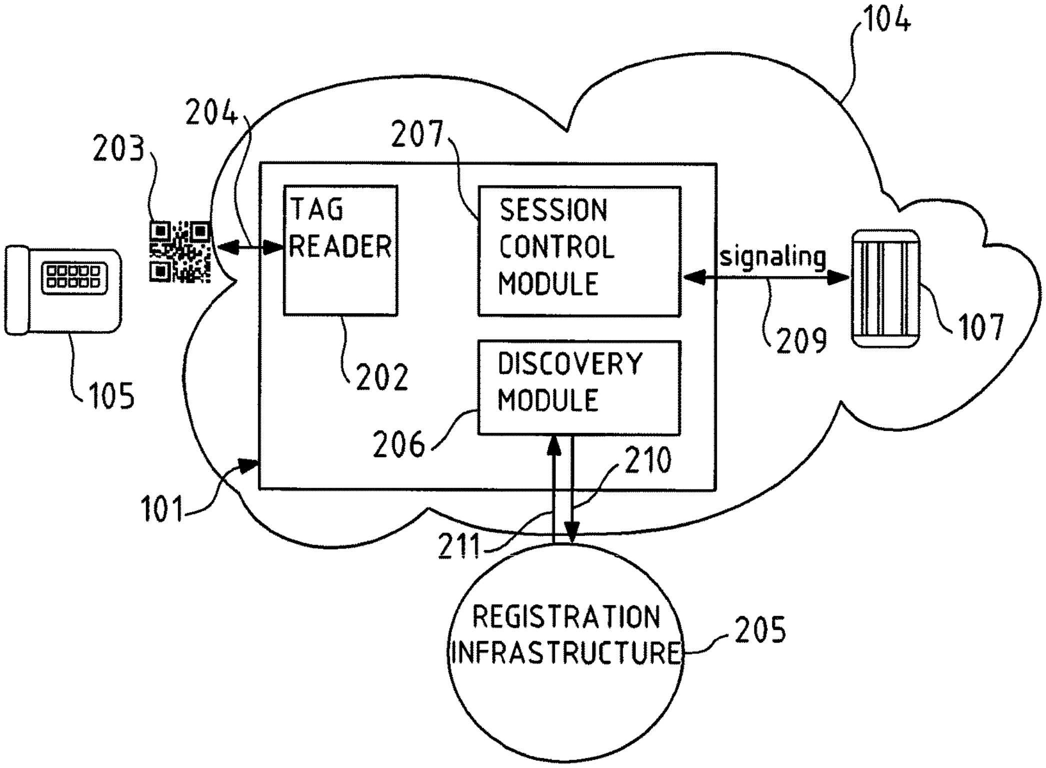
FIG. 2 schematically illustrates the initial communication device of FIG. 1, according to an embodiment.

With reference to FIG. 2, some specific functional modules embedded in the initial communication device 101 represented on FIG. 1 will now be described. While this description focuses on aspects of the initial communication device 101 that serve to implement a session shifting function, it does not preclude the presence of further conventional components in the initial communication device 101, e.g. data processing means, voice communication means, and human-machine interfaces.

The initial communication device 101 comprises a tag reader 202 for reading an identification tag signal 204 carrying a communication device identifier of the target communication device 105. The identification tag signal 204 carries the communication device identifier identifying uniquely the target communication device 105 in a registration service infrastructure 205.

The user has to bring himself close to the target communication device 105 in order to be able to pick up the target communication device 105 when the target communication device 105 rings.

Therefore, the identification tag signal 204 should be accessed from a very short distance from the target communication device 105. Short distance refers to a distance lower than a short walk for the user to access a target communication device after the user scanned the identification signal thanks to the tag reader 202.

The identification tag signal 204 could be either a radio or infrared digital signal broadcasted by the target communication device 105 itself or carrying picture or string of characters printed on a printable identification tag, e.g. a sticker, arranged on or near the target communication device 105.

For the sake of illustration, the tag reader 202 reads an identification tag 203, and the represented passive identification tag 203 carries the identifier coded as a Quick Response (QR) code. Generally, any other coding format may be used instead of the QR code, for example barcode, for example a two dimensional barcode.

Alternatively, the identification tag 203 may include a passive digital signal transmitter, such as a Near Field Communication (NFC) tag, or an Ultra High Frequency (UHF) tag.

The tag reader 202 employs a reading technology which is adapted to each identification tag 203: radio technology, optical technology, passive technology or active technology, depending on which kind of identification tag is deployed.

The initial communication device 101 further comprises a discovery module 206 for accessing the registration service infrastructure 205 and a session control module 207 for establishing and controlling communication sessions through the private network 104 by exchanging signaling messages 209.

Figure 6:
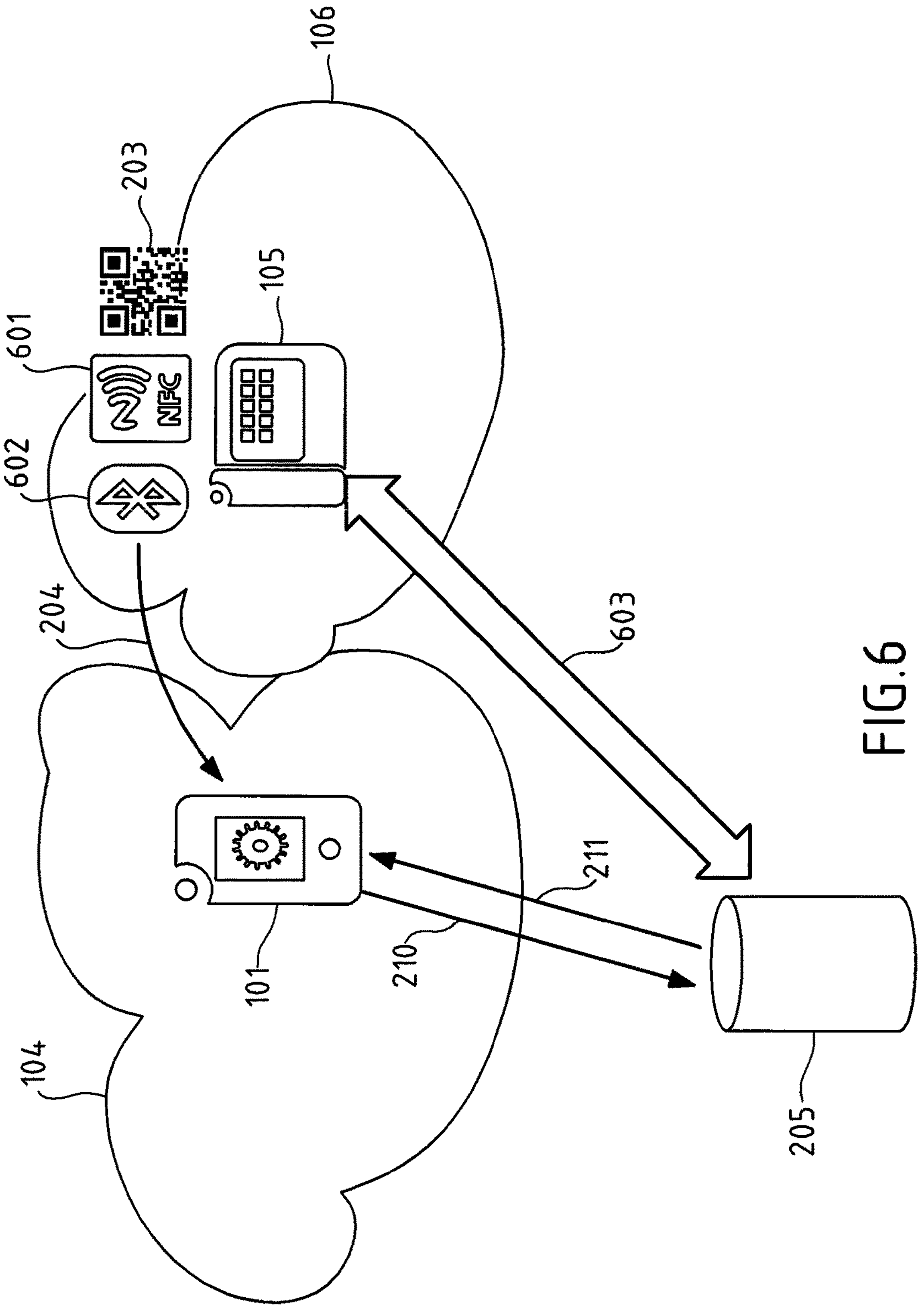
FIG. 6 schematically illustrates the target communication device of FIG. 1 registering to the registration service in the registration service infrastructure of FIG. 3, and the initial communication device receiving a communication device identifier of the target communication device from an identification tag, and checking the validity of the communication device identifier with the registration service.

With reference to FIG. 6, the functionality of the registration service infrastructure 205 will now be described in relation with the target communication device 105 and the initial communication device 101. Two different functions are set up in the registration service infrastructure 205.

A first function is a subscription function that enables a registering communication device to subscribe to a service. The subscription function is illustrated in relation to the target communication device 105 in FIG. 6. A second function is a discovery function that enables a requesting communication device to get network location information for a registered communication device, and to check the integrity and validity of the network location information. The discovery function is illustrated in relation to the initial communication device 101 in FIG. 6.

FIG. 6 illustrates the subscription function by showing the target communication device 105 registering to the registration service in the registration service infrastructure 205, as shown by arrow 603. The registration service infrastructure 205 receives information, and generates and stores a communication device identifier. The registration service is a web service.

A user of the target communication device 105 then makes the communication device identifier available by an identification tag previously described. Some of them are illustrated: QR identification tag 203, passive NFC tag 601 and active Bluetooth tag 602. In all cases, an identification signal 204 carrying the communication device identifier of the communication device can be read by an appropriate tag reader 202.

The tag reader 202 embedded in the initial communication device 101 reads the identification signal 204.

FIG. 6 illustrates the discovery function by showing the registration service infrastructure 205 receiving the discovery request 210 from the initial communication device 101. The registration service infrastructure 205 sends back the discovery response 211 whose content will be later described. The discovery request 210 is an HTTP request.

Figure 3:
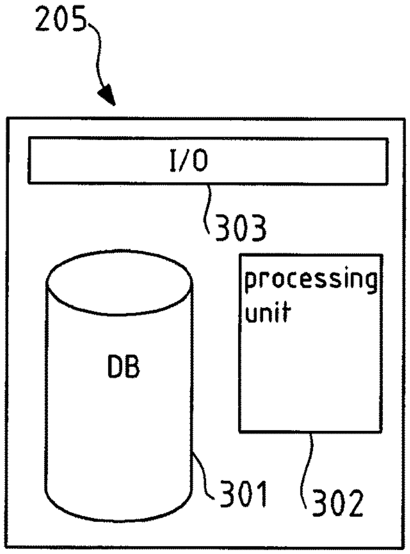
FIG. 3 schematically illustrates a registration service infrastructure.

The structure of the registration service infrastructure 205 is represented in more details with reference to FIG. 3. The registration service infrastructure 205 comprises a registration data repository 301, a data processing unit 302 and a network interface 303.

To perform the subscription function, the network interface 303 is configured to receive registering requests from registering communication devices. This will be explained in more details with reference to FIG. 8. A registration request comprises network location information of a registering communication device.

The data processing unit 302 is configured to generate a communication device identifier associated with the registering communication device. This identifier is the digest result of a one-way hash function, for instance the hash function SHA256 from the SHA2 hash family functions.

For example, the target communication device 105 sends a registering request to the registration service infrastructure 205 through the network interface 303. The registering request is an HTTP request using a secured protocol ensuring confidentiality and integrity of exchanged messages, and strong authentication of the registration service infrastructure. This protocol can be any application protocol over the transport layer protocol TLS (Transport Layer Security). The data processing unit 302 therefore generates a communication device identifier for the target communication device 105. This identifier is generated using a one-way hash function taking as input the data contained in the registering request. For the sake of simplicity, let us say that the generated communication device identifier is the reference numeral "105".

The data processing unit 302 is also configured to store into the registration data repository 301 the generated device identifier, in association with the received network location information.

For example, the data processing unit 302 stores into the registration data repository 301 the numeral "105" in association with the network location information of the target communication device 105. For example, the associated network location information received from the target communication device 105 is an external phone number: +33390123456. Therefore, the data processing unit 302 stores into the registration data repository 301 the numeral "105" in association with the phone number "+33390123456".

The data processing unit 302 is further configured to send to the registering communication device the generated device identifier through the network interface 303.

For example, the data processing unit 302 sends to the target communication device 105 the numeral "105".

The subscription process which was just described in relation to the target communication device 105 may be performed from a different console than the communication device 105 itself. In an embodiment, a network management console connected to the Internet is employed for populating the data repository 301. In an embodiment, the subscription function is accessed through a web portal by any computer connected to the Internet.

Therefore, the registration data repository 301 stores a plurality of communication device identifiers. Each device identifier is stored in association with network location information of a registered communication device. The network location information comprises information for switching communication sessions to the registered communication device.

In a very simple embodiment, the network location information consists of a public identifier of the communication device. For example, the registration data repository 301 comprises a table in which communication device identifiers and associated network location information are stored as follows:

| Identifier of the communication device | network location information<br>Public identifier of the communication device |
|---|---|
| 105 | External phone number of the deskphone 105: +33390123456 |
| Identifier of a digital tablet DT | Session Initiation Protocol (SIP) Uniform Resource Identifier (URI) of the digital tablet DT: sip:myTablet@al-enterprise.com |
| Identifier of a computer C | SIP URI of the computer C: sip:myComputer@al-enterprise.com |

In a more complete embodiment, a registered communication device shares the following network location information related to its identity through the registration service infrastructure 205:

1. An identifier of the registered communication device infrastructure, e.g. the communication server FQDN;
2. One or several local private identifiers of the registered communication device in its infrastructure;
3. One or several public identifiers of the registered communication device. These identifiers depend on the public communication infrastructures the registered communication device system is connected with.

Optionally, the registered communication device shares supplementary information such as:

The kind of media supported or allowed by the registered communication device, e.g. video media Some restrictions depending on the session shift context, e.g. hourly access restriction or call destination limitations.

For example, the network location information and supplementary information are xml formatted and looks like the following:

```
<DeviceInfos>
  <InfrastructureId>https://www.mycompany.com</InfrastructureId>
  <Services>
        <Media>
              <Medium>audio</Medium>
              <Medium>video</Medium>
              <Medium>chat</Medium>
        </Media>
  </Services>
  <DeviceId>
        <Internal>20012345</Internal>
        <External>+33390612345</External>
  </DeviceId>
</DeviceInfos>
```

For example, the network location information and supplementary information are json formatted and looks like the following:

```
{"DeviceInfos": {
  "InfrastructureId": "https://www.mycompany.com",
  "Services":{
        "Media": [
              "Medium":"audio",
              "Medium":"video",
              "Medium":"chat"
              ]
        },
  "DeviceId":{
        "Internal":"20012345",
        "External":"+33390612345"
        },
  "TimeOut":"3600"
  }
}
```

All the shared network location information and supplementary information are stored in the registration data repository 301 in association with the generated communication device identifiers.

As previously explained, the registration service infrastructure 205 comprises a network interface 303. To perform the discovery functions, the network interface 303 is further configured for receiving discovery requests 210 from the discovery module 206 of a requesting communication device and answering discovery responses 211 to the discovery module 206 of the requesting communication device, as shown by the arrows. The discovery request 210 is an HTTP request to the web service. The discovery requests 210 and discovery response 211 are transmitted over the network through a secured transport protocol (e.g. TLS) that ensures confidentiality and integrity of the transported information, and strong authentication of the registration service infrastructure by the requesting communication device thanks to its associated server certificate (e.g. using X.509v3 digital certificates). This protocol can be any application protocol over the transport layer protocol TLS (Transport Layer Security).

In the example depicted on FIG. 2, the requesting communication device is the initial communication device 101 introduced in FIG. 1 and the discovery request 210 comprises the communication device identifier of the target communication device 105, which is comprised in the identification signal 204 received by the tag reader 202.

The data processing unit 302 of the registration service infrastructure 205 is configured to retrieve the network location information and optionally supplementary information associated with the communication device identifier of the target communication device 105 from the registration data repository 301.

The network interface 303 is further configured to send the discovery response 211 to the requesting communication device, i.e. in the previous example the initial communication device 101.

The discovery response 211 comprises the retrieved network location information and supplementary information as the case may be.

The discovery response 211 further comprises the hashcode that is a digest value computed at the subscription step with a hash function. As explained above, this hashcode is the result of the transformation of the network location information and supplementary information through a one-way hash function. Thanks to the properties of digest obtained from hash functions, this hashcode is unique to the communication device identifier and non reversible. Such hashed identifier is precomputed during subscription step and stored in the database 301.

The discovery module 206 of the initial communication device 101 is configured to apply the same hash function on the target communication device identifier received from the identification signal 204 in order to get a calculated encrypted communication device identifier.

The discovery module 206 of the initial communication device 101 obtains the hashcode from the discovery response 211 and then compares it with the communication device identifier read in the tag in order to test equality between both.

Therefore, the integrity of the target communication device identifier is ensured and derived from the secured and authenticated initial request, in order to protect end users from illegitimate attempts of re-routing media of the communication session to an untrusted communication device. For example, the QR identification tag 203 could be forged manually in an attempt to take control of the media for malicious purposes, for instance, for redirecting the media over a premium rate audio service without the consent of the user.

Thanks to the discovery response 211, the session control module 207 of the initial communication device 101 will be able to communicate to the private network 104 the necessary network location information for shifting a current communication session to the target communication device 105.

A main actor of the shifting of the communication session to the target communication device 105 is the home communication node 107 of the initial communication device 101.

Figure 4:
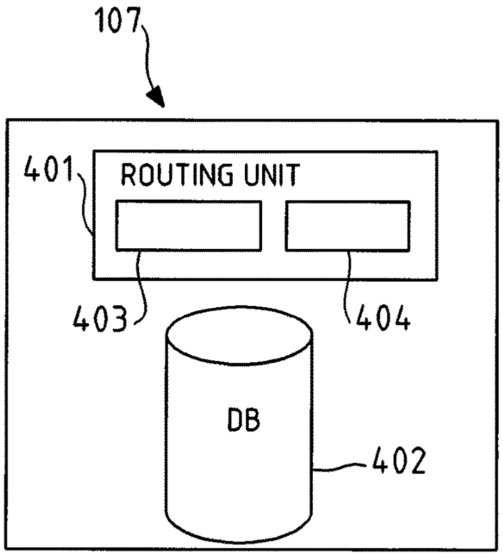
FIG. 4 schematically illustrates a home communication node which handles all communication sessions with the initial communication device of the FIG. 1.

With reference to FIG. 4, the home communication node 107 which handles all communication sessions involving the initial communication device 101 will be described.

The home communication node 107 comprises a routing unit 401 and a database 402 which contains registration information for all communication terminals belonging to private network 104.

The routing unit 401 comprises a routing controller 403 for receiving signaling messages 209 from all communication devices belonging to private network 104 and establishing and handling communication sessions involving one of these communication devices. The routing unit 401 also comprises a media node 404 for transmitting media from a communication device of private network 104 to any communication device, belonging to the same private network 104 or not. The media node 404 is a media gateway which enables the transmission of media streams and transcoding operation on the media streams, i.e. for example transforming VoIP media streams into analogical media streams, or changing the format of the media streams incoming from an external network into a format adapted to the internal network. In an embodiment, the media node 404 is a media gateway without any transcoding function. In such case, the media node 404 transmits media streams, for example Real Time Packet (RTP) fluxes, without any change.

For example, the home communication node 107 is a Private Branching Exchange (PBX) connected to the Internet or to the public switched telephonic network. A PBX is a server dedicated to the establishment of communication sessions between a plurality of communication devices belonging to a same private network, e.g. all communication devices of a company are connected to the PBX of the company, either by a wired connection or a wireless connection, thanks to a dedicated software application. The plurality of communication devices of a same private network are interconnected and registered in the PBX which routes the communication messages from and to them. The PBX also enables the establishment of communication sessions between a communication device of the private network 104 and other communication devices connected to the private network 104. Moreover, the PBX also enables the establishment of communication sessions between a communication device of the private network 104 and communication devices connected to external networks.

Therefore, through the intermediate of the home communication node 107, the initial communication device 101 belonging to the private network 104 can communicate with the remote communication device 102, regardless of whether the remote communication device 102 belongs to the private network 104 or not.

For example, the communication session is a call session between the user of the initial communication device 101 and the user of the remote communication device 102. For example, the initial communication device 101 is a mobile phone and the remote communication device 102 is a deskphone. The deskphone calls the mobile phone. The call is routed by the telecom operator of the network infrastructure of the deskphone, for example the Internet Service Provider "Free", to the home communication node 107, in which the initial communication device 101 is registered, i.e. the PBX of the call destination. Then, the routing controller 403 of the home communication node 107 routes the call in the private network 104 in order to reach the initial communication device 101. The initial communication device 101 rings and the user of the initial communication device 101 picks up the mobile phone to answer the call. The communication session involving the initial communication device 101 and the remote communication device 102 is established.

The initial communication device 101 is any of the following: a deskphone, a mobile phone, a digital tablet, a computer with embedded communication application, e.g. Skype.

The addresses of the communication devices which are belonging to the private network 104 are registered in the database 402 of the home communication node 107.

For example, the database of the home communication node 107 comprises a look-up table as follows:

| Identifier of the communication device | Address of the communication device |
|---|---|
| A | Mobile phone number of the mobile phone A |
| B | IP address of the digital tablet B |
| C | IP address of the computer C |
| D | Phone number of the deskphone D |
| E | Phone number of the initial communication device 101 (Either the GSM number, or an internal number associated with the GSM number) |

Figure 5:
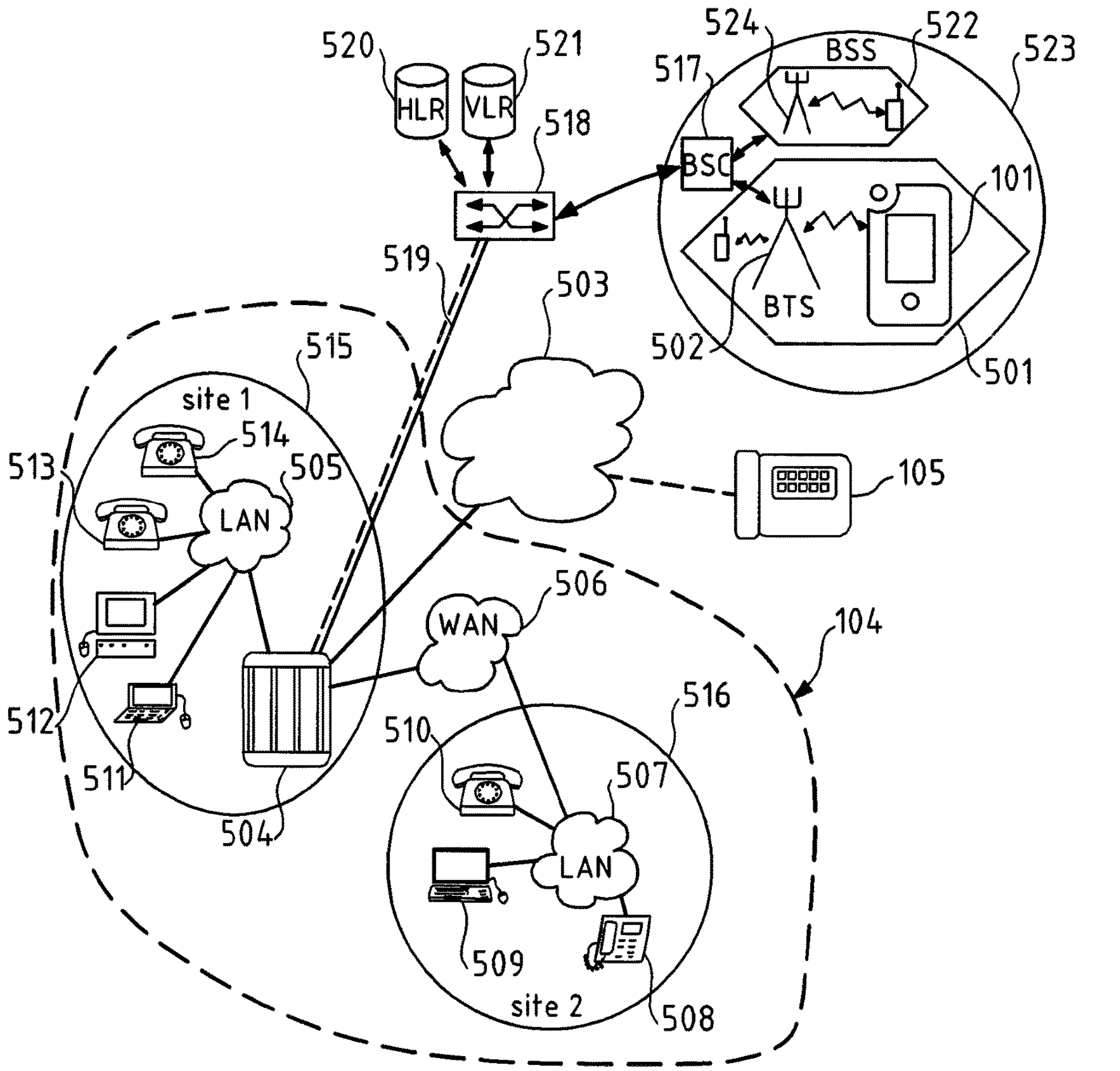
FIG. 5 schematically illustrates the network infrastructure of the initial communication device of FIG. 2.

While FIG. 1 shows a very simplified overview of the private network 104, FIG. 5 provides a more detailed implementation of the private communication network that can be employed in FIG. 1. The home communication node 107 is a PBX 504. Elements that are identical or similar to those of FIG. 1 are designated by the same reference numeral as in FIG. 1. FIG. 5 illustrates the private network 104 for the case of a two-site company. In a first site 515 of the company, a plurality of communication terminals 511, 512, 513 and 514 are connected through a Local Area Network (LAN) 505. In a second site 516 of the company, a plurality of communication terminals 510, 509 and 508 are connected through a Local Area Network (LAN) 507. The two sites 515 and 516 are interconnected through a Wide Area Network (WAN) 506. An internal communication session between any two of the communication terminals of the private network 104 of the company is established through the PBX 504, which is a communication switch. Besides, the PBX 504 is also an endpoint of external networks, i.e. other networks than the private communication network. In the example pictured on FIG. 5, an external network 503 is represented. The external network 503 may be the Internet, or a carrier network. Therefore, the PBX 504 is configured as an interface between the private network 104 and external communication networks. The PBX 504 enables any communication device belonging to the private network 104 to call the target communication device 105, which is in this illustrative example connected to the external network 503 and not belonging to the private network 104.

The private network 104 also comprises the initial communication device 101, which is in this illustrative example a mobile phone. The initial communication device 101 is connected to the PBX 504 through a cellular, e.g. Global System for Mobile Communications (GSM) or UMTS infrastructure. Such cellular infrastructure is well known in the art.

The initial communication device 101 is located in a cell 501 comprising a base transceiver station 502 which is the antenna for emitting and receiving media to and from the initial communication device 101. The base transceiver station 502 is connected to a base station controller 517 for controlling one or more base transceiver stations 502, 524. The base station controller 517 is connected to a mobile switching center (MSC) 518 which routes the media to and from the initial communication device 101 to the PBX 504, as shown by dashed-line arrow 519. In a known manner, the GSM infrastructure also comprises Home Location Register (HLR) 520 for registering addresses of subscribing communication devices and Visiting Location Register (VLR) 521 which is the register of visiting communication devices. The BSC 517 and the cell 501 are comprised in a Base Station Sub-System (BSS) 523, which also comprises another cell 522.

Figure 7:
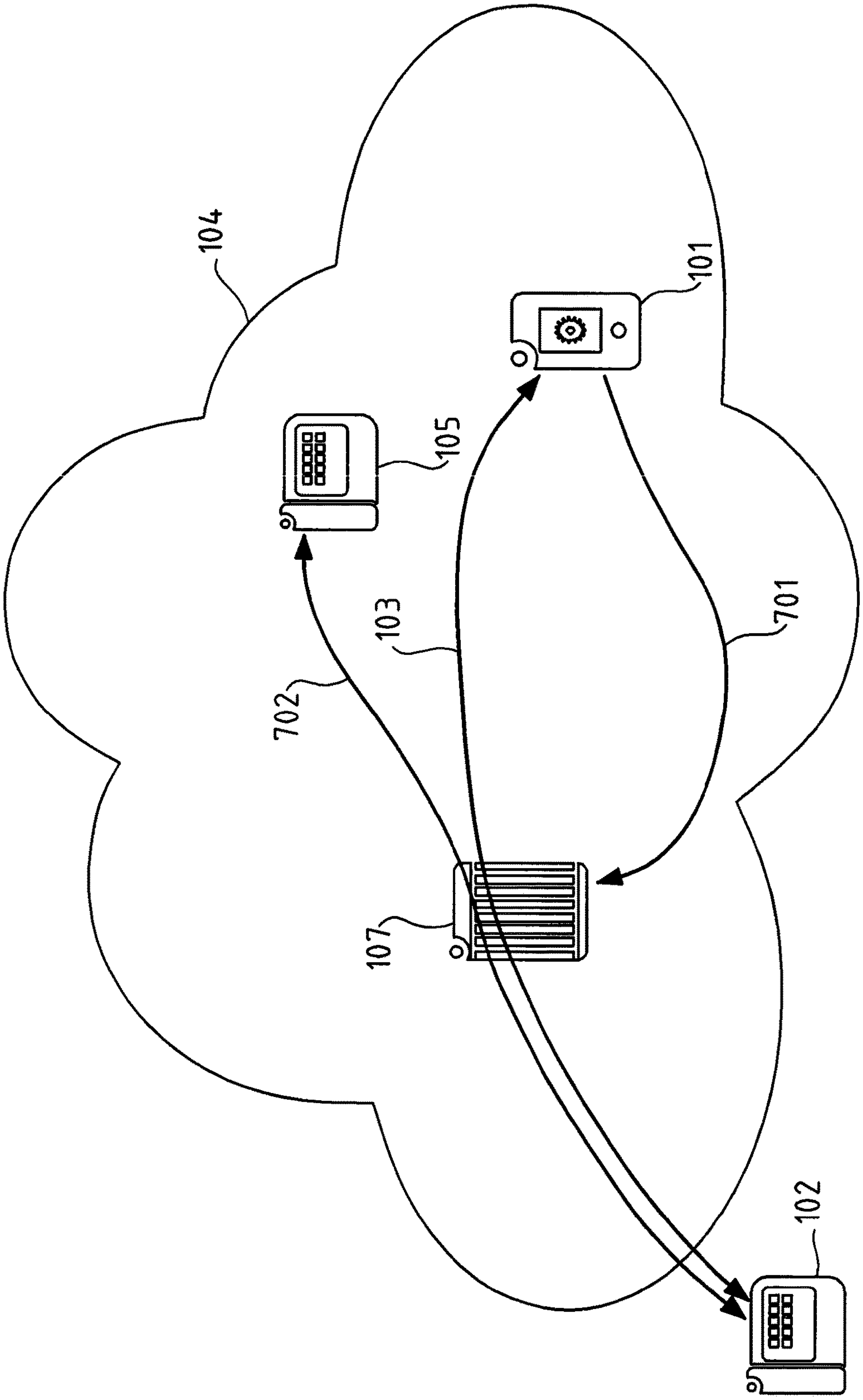
FIG. 7 schematically illustrates the home communication node of FIG. 4 re-routing media from the initial communication device of FIG. 1 to the target communication device of FIG. 3 when the initial communication device and the target communication device are in the same private network, in order to shift the communication session from the initial communication device to the target communication device.
Figure 8:
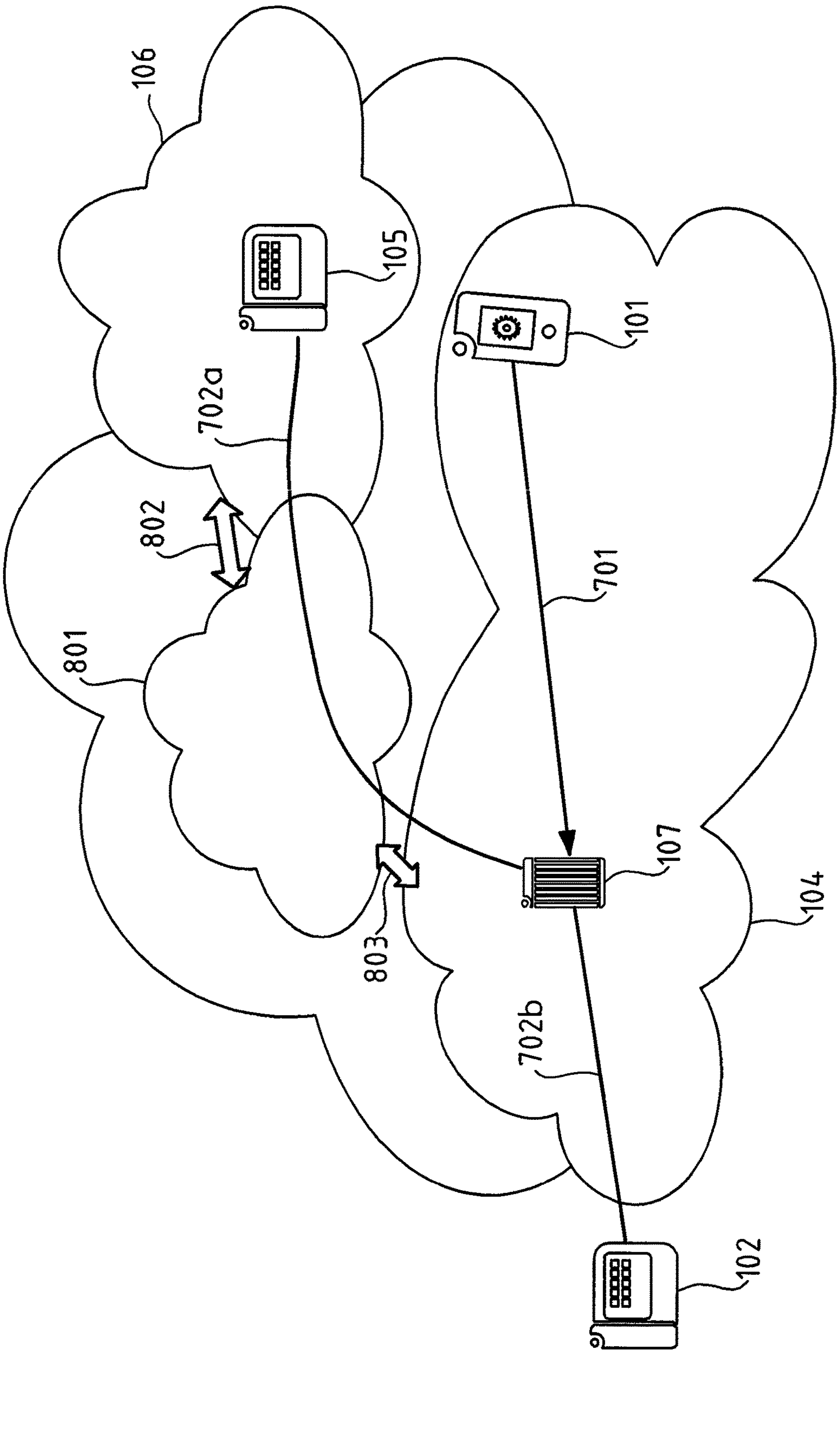
FIG. 8 schematically illustrates the home communication node of FIG. 4 re-routing media from the initial communication device of FIG. 1 to the target communication device of FIG. 3 through a carrier network when the initial communication device and the target communication device are in different private networks, in order to shift the communication session from the initial communication device to the target communication device.

The re-routing of the communication session by home communication node 107 from the initial communication device 101 to the target communication device 105 will now be described with reference to FIGS. 7 and 8. FIGS. 7 and 8 correspond to two different cases.

With reference now to FIG. 7, the initial communication device 101 and the target communication device 105 are belonging to the same private network 104. The home communication node 107 of the initial communication device 101 is therefore also the home communication node 107 of the target communication device 105. The initial communication device 101 sends a shift request 701 to the home communication node 107 for ordering the shifting of the communication session 103 to the target communication device 105. The shift request 701 comprises the network location information of the target communication device 105, e.g. the internal phone number of the target communication device 105. The home communication node 107 then shifts the communication session 103, i.e. re-route the media streams, to the target communication device 105. As a result, a new communication session 702 between the remote communication device 102 and the target communication device 105 is created, and the communication session 103 is over.

With reference now to FIG. 8, the initial communication device 101 and the target communication device 105 are not belonging to the same private network 104. The initial communication device 101 belongs to the private network 104 whereas the target communication device 105 belongs to the network infrastructure 106. Similarly, the initial communication device 101 sends the shift request 701 comprising network location information of the target communication device 105 to the home communication node 107. In the present case, the home communication node 107 is the home communication node of the initial communication device 101. The home communication node 107 redirects the media by shifting the communication session 103 to the target communication device 105, as shown by the lines 702*a* and 702*b*, thanks to the network location information of the target communication device 105. The media should therefore be redirected through a carrier network 801 of the initial communication device 101. As the initial communication device 101 must be close to the target communication device 105 to be able to read the identification indication broadcasted by this device, it is likely that the media streams emitted and received by the initial communication device 101 are attached to the home communication node through a mobile carrier network. Similarly, in addition to his belonging to the private network infrastructure 106, the target communication device 105 is registered in the carrier network 801. This carrier network is interconnected with private network infrastructure 104 and 106 through SIP trunks or T2 trunks. The media are transmitted from the private network 104 to the carrier network 801 then to the network infrastructure 106 through Session Initiation Protocol (SIP) trunks represented by arrows 802 and 803.

The exchanges of messages described hereinabove for registering to the registration service infrastructure 205, discovering network location information for shifting the communication session 103 and shifting the communication session 103 will now be described and completed by means of call flows represented with reference to FIGS. 9 to 11. In this example, the initial communication node 101 is a mobile phone 901, the target communication node 105 is a deskphone 902 and the remote communication node 102 is referred to as a remote caller 903.

Figure 9:
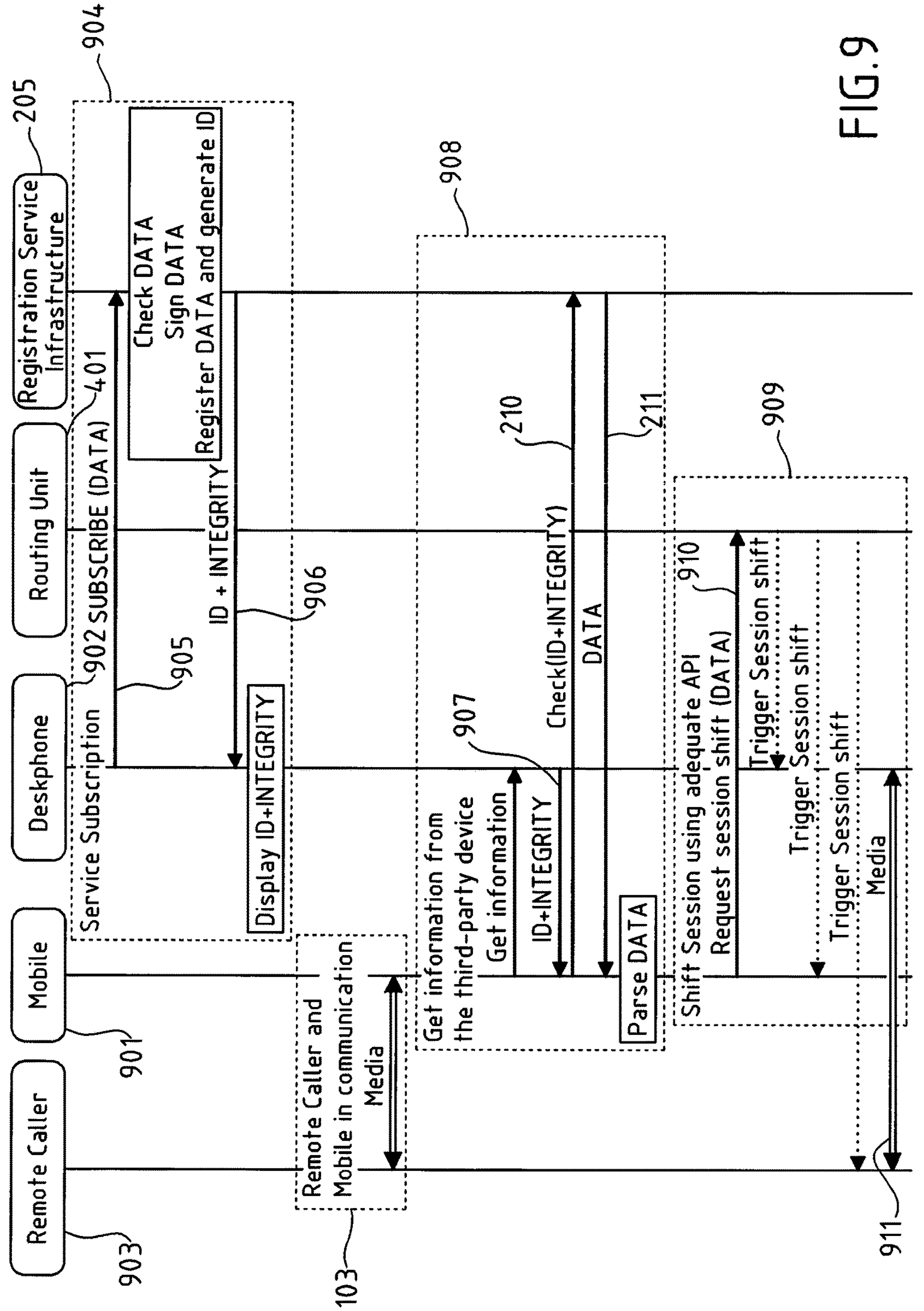
FIG. 9 is a call flow of messages represented on FIG. 5 and FIG. 7.

With reference now to FIG. 9, a service subscription 904 of the deskphone 902 to the registration service infrastructure 205 is represented. The deskphone 902 sends a registering request 905 called SUBSCRIBE and comprising Data. The data comprises network location information as previously described with reference to FIG. 3. The registration service infrastructure 205 checks the data, signs the data, registers the data and generates the deskphone identifier (ID). Then, the registration service infrastructure 205 sends a registering response 906 comprising the ID and an integrity check value, i.e. encrypted ID, for example generated thanks to a hash function. The deskphone 902 then displays the ID and the integrity check value, for example by means of a display screen. A user may print a passive tag, e.g. QR tag carrying the ID and the integrity check value and arranged the passive tag on the deskphone 902 or close to it.

Let us now assume that a communication session 103 is established between the remote caller 903 and the mobile phone 901. The user of the mobile phone 901 wants to get information from the deskphone 902 in order to shift the communication session 103 to the deskphone 902. A corresponding discovery stage 908 is now described. The mobile phone 901 scans the QR tag carrying the deskphone ID and integrity check value. The mobile phone 901 gets the deskphone ID and integrity check value in an identification signal 907, which consists of a digital image file in the present example.

The mobile phone 901 sends a discovery request 210 comprising the ID and integrity check value to the registration service infrastructure 205. The registration service infrastructure 205 sends a discovery response 211 comprising data to the mobile phone 901. The data comprises the network location information of the deskphone 902. The mobile phone 901 then parses the received data.

A session shifting stage 909 will now be described. The session shifting stage 909 employs an adequate Application Programming Interface (API). The mobile phone 901 sends a shift request 910 to the routing unit 401 of the home communication node of the mobile phone 901. The routing unit 401 triggers session shift on the three involved communication devices: the deskphone 902, the mobile phone 901 and the remote caller 903, such as to shift the communication session 103 from the mobile phone 901 to the deskphone 902.

Resulting from the triggering of the session shift, the communication session 103 is shifted and results in a communication session 911 between the remote caller 903 and the deskphone 902. The communication session 911 does not involve the mobile phone 901 anymore.

Figure 10:
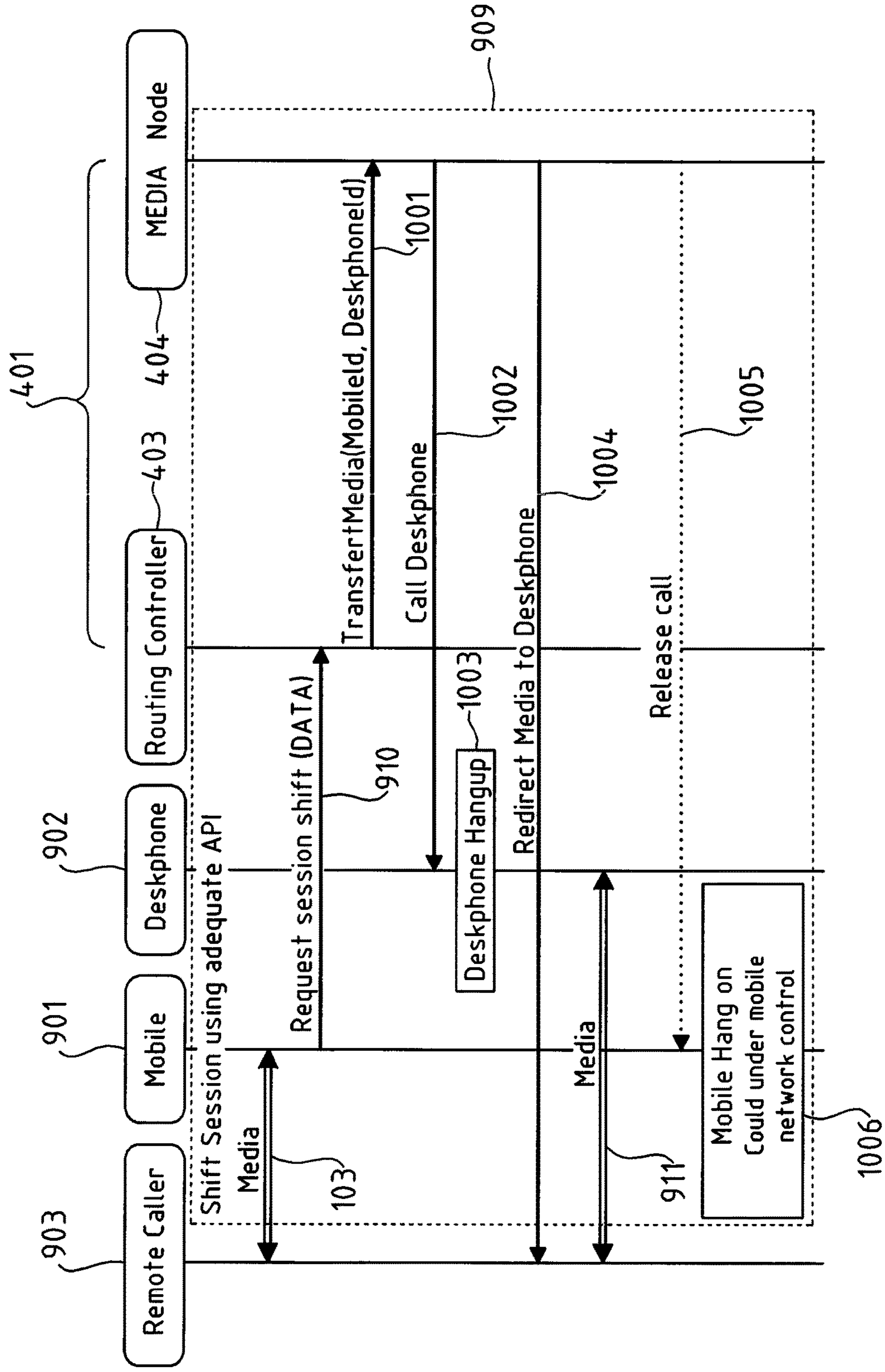
FIG. 10 and FIG. 11 are call flows representing two different embodiments for shifting the communication session from the initial communication device to the target communication device.
Figure 11:
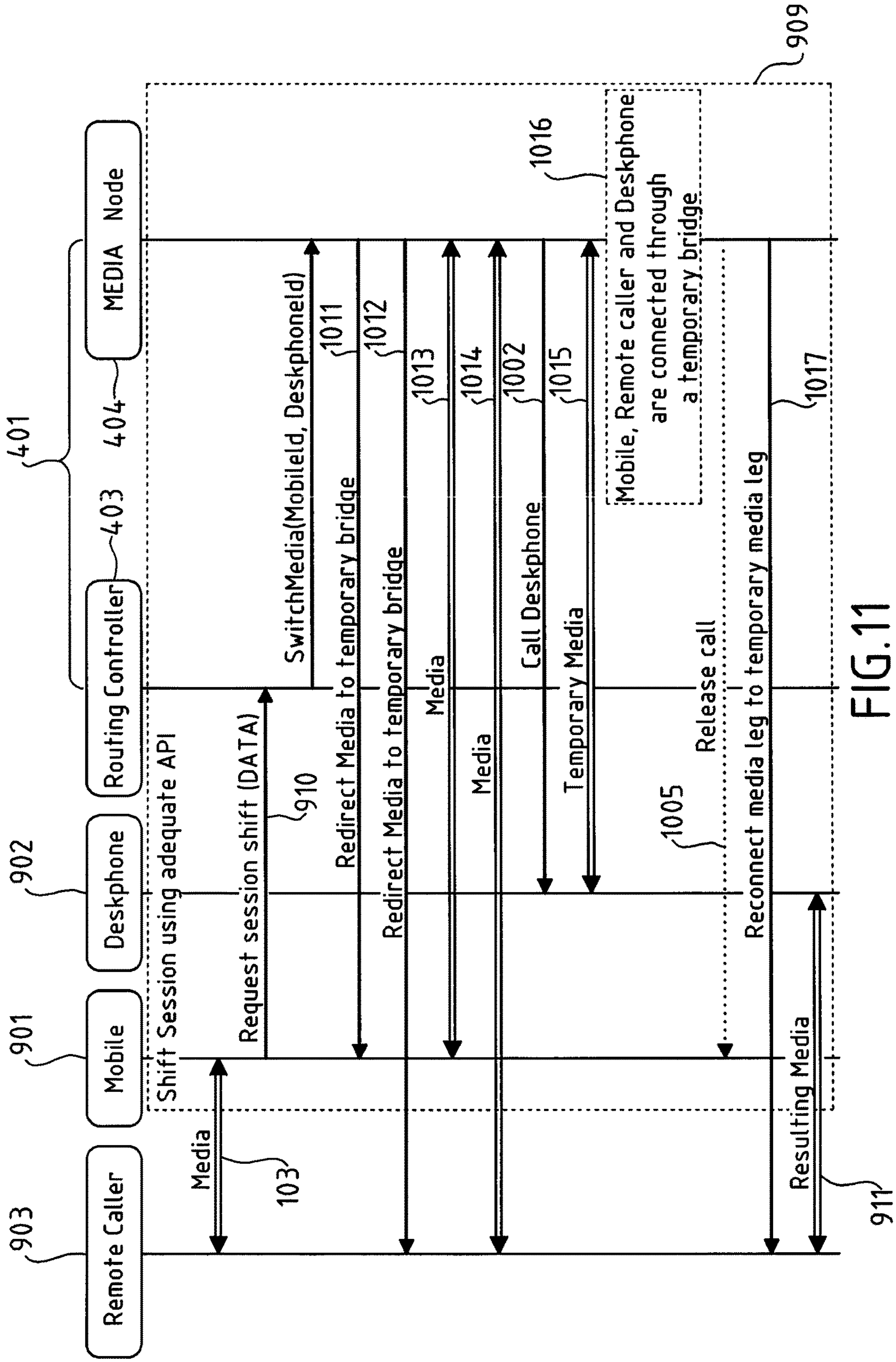

FIG. 10 and FIG. 11 show two modified implementations of the session shifting stage 909 of FIG. 9. As represented, the remote caller 903 and the mobile phone 901 are in a communication session 103. The mobile phone 903 sends a shift request 910 to the routing unit 401 for shifting the communication session 103 to the deskphone 902 thanks to the data.

With reference to FIG. 10, the media streams are directly transferred in the new communication session 911. The shift request 910 arrives to the routing controller 403 of the routing unit 401. The routing controller 403 then sends a request 1001 to the media node 404 for transferring the media. The request 1001 comprises an identifier of the mobile phone 901 and an identifier of the deskphone 902 in order to allow the media node 404 to call the deskphone, as represented by the arrow 1002. The identifier of the deskphone 902 comes from the received data in the discovery response 211. The deskphone 902 is hung up by the user, as represented by the box 1003. The media node 404 therefore redirects the media to the deskphone, as shown by the arrow 1004, which results in the new communication session 911. The media node 404 orders the release of the call involving the mobile phone 901, as represented by the arrow 1005. The mobile phone 901 then hang on, as represented by the box 1006.

FIG. 11 illustrates a case in which the media streams are redirected from the communication session 103 to the new communication session 911 by way of a temporary conference bridge hosted in the home communication node 107. The shift request 910 arrives to the routing controller 403 of the routing unit 401. The routing controller 403 then sends a request 1001 to the media node 404 for switching the media streams. The request 1001 comprises an identifier of the mobile phone 901 and an identifier of the deskphone 902 in order to allow the media node 404 to call the deskphone, as represented by the arrow 1002. The identifier of the deskphone 902 comes from the data received in the discovery response 211. Prior to calling the deskphone 902, the media node creates a temporary bridge and then redirects media streams to the temporary bridge, as shown by arrows 1011 and 1012. The temporary bridge allows mixing and redirecting media streams. Media streams are thus exchanged between the media node 404 and the mobile phone 901, and respectively between the media node 404 and the remote caller 903, as shown by arrows 1013 and 1014. Once the deskphone 902 is called, the media node 404 temporarily exchanges media streams with the deskphone 902, as represented by arrow 1015.

The mobile phone 901, the remote caller 903 and the deskphone 902 are therefore connected through a temporary bridge, as shown by the box 1016.

The media node 404 orders the release of the call involving the mobile phone 901, as represented by the arrow 1005. Then, the media node 404 reconnects media leg to temporary media leg, as shown by arrow 1017, resulting in the communication session 911 between the remote caller 903 and the deskphone 902.

Figure 12:
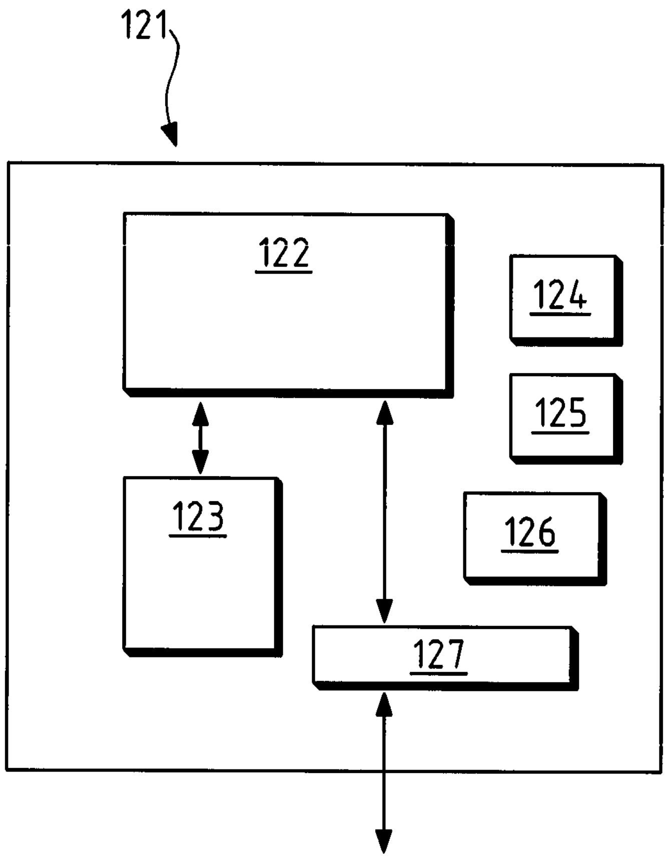
FIG. 12 schematically illustrates a computing device according to an embodiment.

FIG. 12 illustrates a computing device 121 which can be used for implementing any of the following: registration service infrastructure, communication devices, home communication node and PBX. The computing device 121 comprises a data repository 122 connected to a processing unit 123 and to a communication interface 127. For example, the data repository is a hard drive, a ROM, a RAM or other. The computing device 121 also comprises an input device 124, an output device 125 and an analog-to-digital and/or digital-to-analog converter 126. In embodiments, the input device 124 is a mouse, a joystick, a touch screen, a voice recorder etc. In embodiments, the output device 125 is a display device such as a two-dimensional screen or a three-dimensional screen. Further output devices may be employed such as a loudspeaker, or a Braille computer display, speech synthesizer etc. The communication interface 127 is connected to other devices and/or to the Internet in various manners, e.g. through a wired and/or a wireless connection, e.g. Wi-Fi, Bluetooth, etc.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software.

The registration service infrastructure, communication devices, home communication node and PBX, described hereinabove may be implemented through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, the term "hardware" should not be construed to refer exclusively to hardware capable of executing software, and may include, without limitation, central processing unit (CPU), digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. The registration service infrastructure described hereinabove may be implemented in a unitary manner or in a distributed manner.

In the claims, any reference signs placed between parentheses shall not be construed as limiting the scope of the claims.

The invention claimed is:

1. A method for shifting a communication session from an initial communication device to a target communication device, the method comprising:

reading, by the initial communication device, an identification signal comprising an identification indication of the target communication device, wherein the identification signal is read from an identification tag located in, or at a short distance from, the target communication device;

sending, by the initial communication device, a discovery request to a registration service infrastructure, wherein the registration service infrastructure comprises a registration data repository in which network location information of the target communication device is stored, and wherein the discovery request comprises the identification indication of the target communication device;

receiving, by the initial communication device, a discovery response from the registration service infrastructure, wherein the discovery response comprises the network location information of the target communication device and an encrypted communication device identifier;

applying, by the initial communication device, a cryptographic function to the identification indication of the target communication device, thereby resulting in a calculated encrypted identification indication;

comparing, by the initial communication device, the calculated encrypted identification indication to the encrypted communication device identifier;

after determining that the calculated encrypted identification indication is equivalent to the encrypted communication device identifier, sending, by the initial communication device, a shift request to a home communication node of the initial communication device for shifting the communication session from the initial communication device to the target communication device, wherein the communication session was established between the initial communication device and a remote communication device, wherein the home communication node handles all communication sessions for the initial communication device, and wherein the shift request comprises the network location information of the target communication device; and terminating, by the initial communication device, the communication session with the remote communication device.

2. The method according to claim 1, wherein the discovery request is a HyperText Transfer Protocol (HTTP) request and the registration service infrastructure comprises a web server.

3. The method according to claim 1, wherein the identification indication of the target communication device comprises a communication device identifier of the target communication device, and wherein the communication device identifier is stored in the registration data repository of the registration service infrastructure.

4. The method according to claim 1, wherein reading the identification signal comprises receiving a radio signal broadcast by the target communication device.

5. The method according to claim 1, wherein reading the identification signal comprises optically scanning a label on the target communication device.

6. The method according to claim 1, wherein reading the identification signal comprises reading a Near Field Communication (NFC) tag of the target communication device.

7. A communication device comprising:

at least one processor, and memory comprising executable instructions which, when executed by the at least one processor, cause the communication device to:

read an identification tag signal comprising an identification indication of a target communication device, wherein the identification tag signal is read from an identification tag located in, on or at a short distance from the target communication device;

send a discovery request to a registration service infrastructure, wherein the registration service infrastructure comprises a registration data repository in which shared network location information of the target communication device is stored, and wherein the discovery request comprises the identification indication of the target communication device and an encrypted communication device identifier;

receive a discovery response from the registration service infrastructure, the discovery response comprising the shared network location information of the target communication device;

apply a cryptographic function to the identification indication of the target communication device, thereby resulting in a calculated encrypted identification indication;

compare the calculated encrypted identification indication to the encrypted communication device identifier;

after a determination that the calculated encrypted identification indication is equivalent to the encrypted communication device identifier, send, to a home communication node of the communication device, a shift request for shifting a communication session from the communication device to the target communication device, wherein the communication session was established between the communication device and a remote communication device, wherein the home communication node handles all communication sessions for the communication device, and wherein the shift request comprises the shared network location information of the target communication device; and terminate the communication session with the remote communication device.

8. The communication device according to claim 7, wherein the communication device comprises a tag reader comprising an optical camera with image processing capabilities for reading an image.

9. The communication device according to claim 7, wherein the communication device comprises a tag reader comprising a receiver for receiving the identification tag signal as a modulated electromagnetic signal.

10. The communication device according to claim 7, wherein the communication device comprises a tag reader comprising a radio transceiver for reading a passive Radio Frequency Identifier tag.

11. A registration service infrastructure comprising: at least one processor, a registration data repository comprising a plurality of communication device identifiers, each device identifier being stored in association with shared network location information of a respective communication device, and memory comprising executable instructions which, when executed by the at least one processor, cause the registration service infrastructure to:

receive a discovery request from a requesting communication device, wherein the discovery request comprises a communication device identifier of a target communication device, wherein the communication device identifier is carried by an identification tag of the target communication device, and wherein the identification tag is located in, on or at a short distance from the target communication device;

retrieve, from the registration data repository, shared network location information associated with the communication device identifier of the target communication device;

apply a cryptographic function to the communication device identifier of the target communication device, thereby resulting in an encrypted communication device identifier of the target communication device; and send a discovery response to the requesting communication device, wherein the discovery response comprises the encrypted communication device identifier of the target communication device and the retrieved shared network location information, thereby enabling the requesting communication device to shift a communication session to the target communication device.

12. The registration service infrastructure according to claim 11, wherein the retrieved shared network location information comprises:

a local identifier of the target communication device, wherein the local identifier of the target communication device is an address of the target communication device in a local network to which the target communication device is connected, and an identifier of a home communication node handling all communication sessions for the target communication device.

13. The registration service infrastructure according to claim 11 wherein the shared network location information is in an extensible markup language (XML) format or a javascript object notation (JSON) format.

14. The registration service infrastructure according to claim 11, wherein the identification tag is an active identification tag comprising a broadcasting module embedded in the target communication device for broadcasting an identification tag signal carrying the communication device identifier of the target communication device, and wherein the identification tag signal is broadcast in a short range area around the target communication device.

15. The registration service infrastructure according to claim 11, wherein the instructions further cause the registration service infrastructure to:

receive a registration request from a registering communication device, the registration request comprising shared network location information of the registering communication device;

generate a communication device identifier associated with the registering communication device;

store, into the registration data repository, the device identifier in association with the received shared network location information of the registering communication device; and send, to the registering communication device, the generated communication device identifier.

16. The registration service infrastructure according to claim 15, wherein the shared network location information of the registering communication device further comprises a public identifier of the target communication device, wherein the public identifier of the target communication device is an address of the target communication device in a public network to which the target communication device is connected.

* * * * *

UNITED STATES PATENT AND TRADEMARK OFFICE

CERTIFICATE OF CORRECTION

PATENT NO. : 10,484,482 B2
APPLICATION NO. : 15/777569
DATED : November 19, 2019
INVENTOR(S) : Benoit Trinite et al.

It is certified that error appears in the above-identified patent and that said Letters Patent is hereby corrected as shown below:

On the Title Page

Column 1, item (72), Inventors, Line 3, delete "Emmanuel Leonidovich Helbert" and insert --Emmanuel Helbert--

Signed and Sealed this
Sixteenth Day of June, 2020

Andrei Iancu
*Director of the United States Patent and Trademark Office*